(12) United States Patent
Takamizawa

(10) Patent No.: US 10,158,279 B2
(45) Date of Patent: Dec. 18, 2018

(54) ARMATURE FOR LINEAR MOTOR, LINEAR MOTOR, AND METHOD OF MANUFACTURING ARMATURE FOR LINEAR MOTOR

(71) Applicant: FANUC CORPORATION, Yamanashi (JP)

(72) Inventor: Suguru Takamizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/839,580

(22) Filed: Dec. 12, 2017

(65) Prior Publication Data

US 2018/0175716 A1 Jun. 21, 2018

(30) Foreign Application Priority Data

Dec. 21, 2016 (JP) ................. 2016-247955

(51) Int. Cl.
| | |
|---|---|
| H02K 41/03 | (2006.01) |
| H02K 1/18 | (2006.01) |
| H02K 1/14 | (2006.01) |
| H02K 1/34 | (2006.01) |
| H02K 3/24 | (2006.01) |

(52) U.S. Cl.
CPC ........... *H02K 41/031* (2013.01); *H02K 1/148* (2013.01); *H02K 1/18* (2013.01); *H02K 1/34* (2013.01); *H02K 3/24* (2013.01)

(58) Field of Classification Search
CPC ........... H02K 41/03; H02K 1/18; H02K 3/34; H02K 3/52; H02K 9/193; H02K 3/345; H02K 9/19; H02K 1/17; H02K 1/26; H02K 41/033

USPC ....................................................... 310/12.01
See application file for complete search history.

(56) References Cited

U.S. PATENT DOCUMENTS

| | | | |
|---|---|---|---|
| 7,633,188 B2 | 12/2009 | Kitade et al. | |
| 2005/0285451 A1* | 12/2005 | Kubo | G03F 7/70758 310/12.15 |
| 2007/0257564 A1* | 11/2007 | Kitade | H02K 41/03 310/12.23 |
| 2009/0230785 A1* | 9/2009 | Ida | H02K 41/03 310/12.31 |

(Continued)

FOREIGN PATENT DOCUMENTS

| | | |
|---|---|---|
| JP | H05-111234 A | 4/1993 |
| JP | H07-250466 A | 9/1995 |

(Continued)

*Primary Examiner* — Naishadh Desai
(74) *Attorney, Agent, or Firm* — Studebaker & Brackett PC

(57) ABSTRACT

An armature includes: an integrated core with multiple split cores coupled to each other; a coupling member for coupling the multiple split cores; a coil attached to the integrated core; a block attachment part provide to a machine attachment side of the integrated core; a protection sheet having ability to be impregnated with resin and covering a surface of the integrated core and a surface of the block attachment part; a block attached to the block attachment part and having a machine attachment surface arranged at the block attachment side of the integrated core; and a resin layer covering the protection sheet covering the integrated core. The machine attachment surface of the block is exposed from the resin layer.

5 Claims, 8 Drawing Sheets

(56) References Cited

U.S. PATENT DOCUMENTS

2013/0049490 A1\* 2/2013 Shimura .............. H02K 41/031
310/12.24

FOREIGN PATENT DOCUMENTS

| JP | H09-070166 | A | 3/1997 |
|----|------------|----|--------|
| JP | 2000-217334 | A | 8/2000 |
| JP | 3698585 | B2 | 9/2005 |
| JP | 2010-115042 | A | 5/2010 |
| JP | 2011-101551 | A | 5/2011 |
| JP | 4886355 | B2 | 2/2012 |
| JP | 2012-055089 | A | 3/2012 |
| JP | 5199427 | B2 | 5/2013 |

\* cited by examiner

ARMATURE FOR LINEAR MOTOR, LINEAR MOTOR, AND METHOD OF MANUFACTURING ARMATURE FOR LINEAR MOTOR

This application is based on and claims the benefit of priority from Japanese Patent Application No. 2016-247955, filed on 21 Dec. 2016, the content of which is incorporated herein by reference.

BACKGROUND OF THE INVENTION

Field of the Invention

The present invention relates to an armature for a linear motor, a linear motor using the same, and a method of manufacturing the armature for the linear motor.

Related Art

Use of linear motors has been suggested in recent years as driving devices for various industrial machines such as mechanisms for driving magnetic heads of OA machines and mechanisms for feeding spindles/tables of machine tools. For simplification of the configurations of linear motors of these types, there has been an increasing tendency toward use of multiple permanent magnets as a field pole.

In some of the linear motors for the above-described purposes, to reduce the likelihood of entry of a foreign material into an armature, etc., a resin layer is formed on a surface of a core as a main body of the armature. When the resin layer is on the surface of the core, troubles in high-temperature or low-temperature environment such as warpage, undulation, breakage, or reduction in dimensional accuracy may occur resulting from a difference in coefficient of linear expansion between the core and resin. To overcome these troubles, an attempt has been made by covering the surface of the core with woven cloth and forming the resin layer through the woven cloth (see Japanese Patent No. 5199427, Japanese Patent No. 3698585, and Japanese Patent No. 4886355, for example).

SUMMARY OF THE INVENTION

To attach the armature to a machine precisely, a machine attachment surface of the core is required to be subject to planarization grinding. This prohibits covering of the machine attachment surface of the core with the woven cloth. However, when the machine attachment surface is not covered with the woven cloth, it is difficult to reduce the likelihood of entry of a foreign material into the armature through the machine attachment surface, etc., which may deteriorate the quality and the reliability of the armature.

Hence, it is desired to make an armature for linear motor and a linear motor having excellent precision in attachment to a machine and capable of reducing the likelihood of trouble in a resin layer and entry of a foreign material into the armature.

It is an object of the present invention to provide an armature for linear motor, a linear motor, and a method for manufacturing the armature for the linear motor having excellent precision in attachment to a machine and capable of reducing the likelihood of trouble in a resin layer, entry of a foreign material, etc.

(1) The present invention relates to an armature (armature 20 described later, for example) for linear motor working cooperatively with a field pole to form a linear motor. The field pole includes magnets of different poles arranged alternately in a driving direction. The armature comprises: an integrated core (core 21 described later, for example) with multiple split cores (split cores 211 described later, for example) coupled to each other; a coupling member (rod 31, nut 32 described later, for example) for coupling the multiple split cores; a coil (coil 22 described later, for example) attached to the integrated core; a block attachment part (block attachment part 23 described later, for example) provided to a machine attachment side of the integrated core; a protection sheet (woven cloth 25 described later, for example) having ability to be impregnated with resin and covering a surface of the integrated core and a surface of the block attachment part; a block (block 24 described later, for example) attached to the block attachment part and having a machine attachment surface (24a described later, for example) arranged at the block attachment side of the integrated core; and a resin layer (resin layer 26 described later, for example) covering the protection sheet covering the integrated core. The machine attachment surface of the block is exposed from the resin layer.

(2) In the armature for linear motor described in (1), the split cores preferably include respective block attachment grooves (block attachment grooves 212 described later, for example) formed at coupling surfaces (coupling surfaces 211a described later, for example) of the split cores. While the multiple split cores are coupled with the coupling member, opposite ones of the block attachment grooves in a pair preferably form the block attachment part.

(3) In the armature for linear motor described in (1) or (2), the machine attachment surface of the block preferably protrudes from a surface of the resin layer.

(4) The present invention relates to a linear motor (linear motor 1 described later, for example) comprising: a field pole (field pole 10 described later, for example) including magnets of different poles arranged alternately in a driving direction; and the armature (armature 20 described later, for example) for linear motor described in any one of (1) to (3).

(5) The present invention relates to a method of manufacturing an armature (armature 20 described later, for example) for linear motor working cooperatively with a field pole (field pole 10 described later, for example) to form a linear motor. The field pole includes magnets of different poles arranged alternately in a driving direction. The method comprises: a step of arranging multiple split cores (split cores 211 described later, for example) including respective component attachment grooves (block attachment grooves 212 described later, for example) at an interval that allows insertion of an attachment target component (block 24 described later, for example); a step of covering respective surfaces of the split cores and respective surfaces of the component attachment grooves with a protection sheet (woven cloth 25 described later, for example); a step of inserting the component between the component attachment grooves of adjacent ones of the split cores; a step of fixing the protection sheet between the component attachment grooves of adjacent ones of the split cores and the component by coupling the multiple split cores with a coupling member (rod 31, nut 32 described later, for example) and making tight contact between the adjacent ones of the split cores; and a step of forming a resin layer (resin layer 26 described later, for example) on the respective surfaces of the split cores covered with the protection sheet.

An armature for linear motor, a linear motor, and a method of manufacturing the armature for linear motor to be provided by the present invention have excellent precision in attachment to a machine and are capable of reducing the likelihood of trouble in a resin layer, entry of a foreign material, etc.

DETAILED DESCRIPTION OF THE INVENTION

Figure 1:
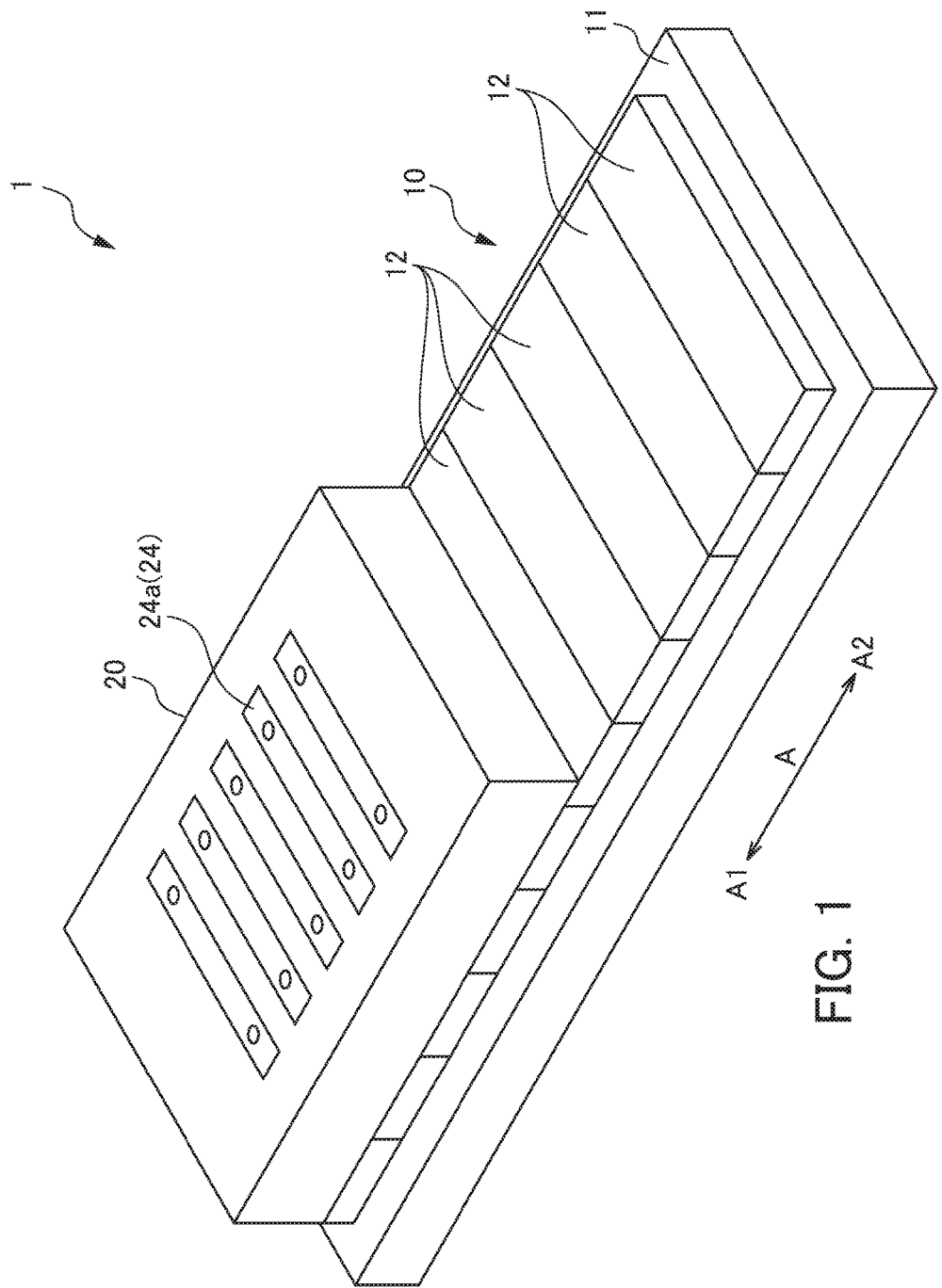
FIG. 1 explains a linear motor 1 of a first embodiment.

Embodiments of the present invention will be described below. All the drawings accompanying this specification are schematic views. In consideration of ease of understanding, etc., each part illustrated in the drawings is changed or exaggerated compared to a real thing in terms of a shape, a scale, a ratio between a vertical dimension and a horizontal dimension, etc. In the drawings, hatching indicating the cross section of a member is omitted, where appropriate.

In this specification, etc., terms used for specifying shapes, geometric conditions, and the extensions of these shapes and levels of these conditions such as "being parallel" and "direction" cover not only the exact meanings of these terms but also a range recognizable as being substantially parallel and a range recognizable as a direction indicated by a corresponding term.

In this specification, etc., a depth direction of a core 21, a depth direction of a spilt core 211, and a longitudinal direction of a block 24 are defined as X (X1-X2) direction, and a width direction of the core 21, a width direction of the split core 211, and a direction in which blocks 24 are arranged are defined as a Y (Y1-Y2) direction. Further, a thickness direction of the core 21, a thickness direction of the split core 211, and a height direction of the block 24 are defined as a Z (Z1-Z2) direction.

First Embodiment

FIG. 1 explains a linear motor 1 of the first embodiment. The linear motor 1 shown in FIG. 1 has a basic configuration common to a second embodiment described later.

Figure 2:
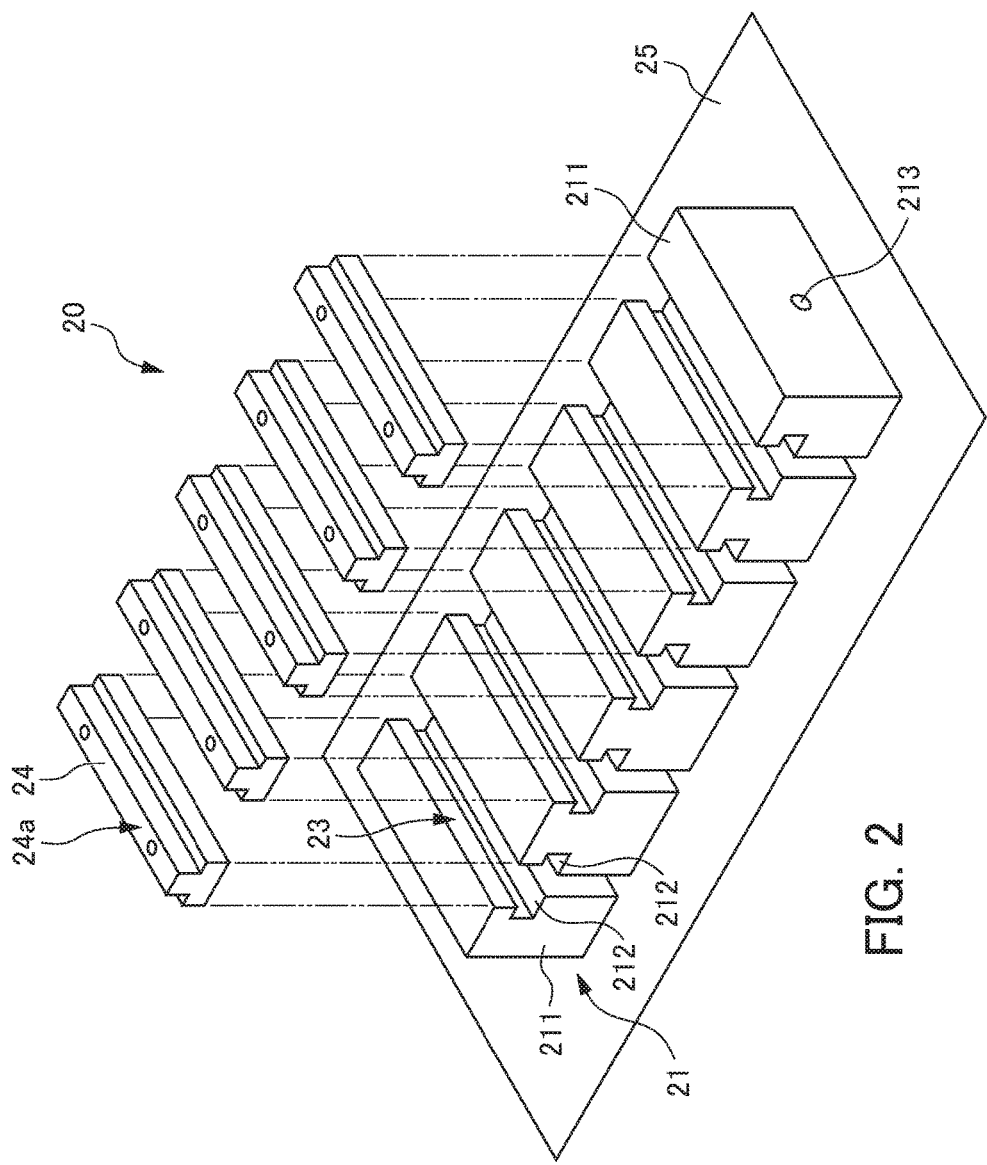
FIG. 2 is an exploded perspective view of an armature 20 of the first embodiment.

FIG. 2 is an exploded perspective view of an armature 20 of the first embodiment.

Figure 3A:
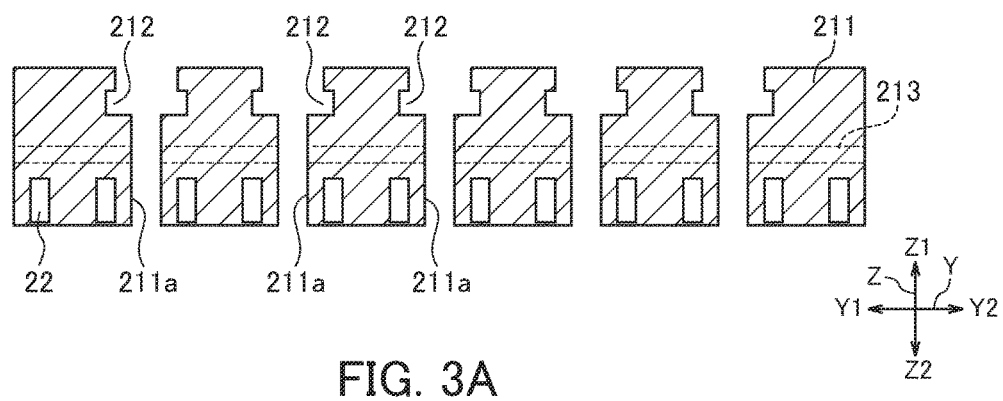
FIG. 3A is a sectional view in a Y-Z plane before split cores 211 are coupled.
Figure 3B:
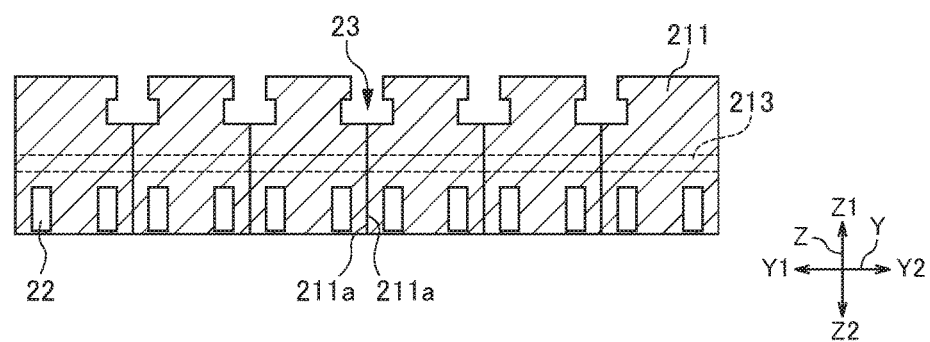
FIG. 3B is a sectional view in the Y-Z plane after the split cores 211 are coupled.
Figure 3C:
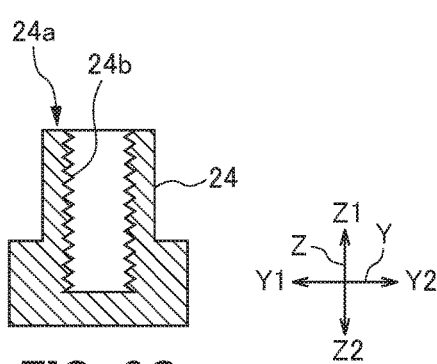
FIG. 3C is a sectional view of a block 24 in the Y-Z plane.

FIG. 3A is a sectional view in a Y-Z plane before split cores 211 are coupled. FIG. 3B is a sectional view in the Y-Z plane after the split cores 211 are coupled. A member such as a rod 31 is omitted from FIG. 3B. FIG. 3C is a sectional view of the block 24 in the Y-Z plane. FIG. 3C shows the cross section of the block 24 in an area where a screw part 24b is formed.

As shown in FIG. 1, the linear motor 1 includes a field pole 10 and the armature 20. The armature 20 has a form with a resin layer 26 described later (see FIG. 4F).

The field pole 10 is a stator with magnets of different poles arranged alternately in a direction in which the armature 20 is driven (in FIG. 1, an A direction). The field pole 10 includes a support surface 11, and multiple permanent magnets 12 arranged substantially parallel to each other (or in a slightly skewed pattern) on the support surface 11. The field pole 10 includes N-pole permanent magnets 12 and S-pole permanent magnets 12 arranged alternately in the direction in which the armature 20 is driven. The permanent magnets 12 are bonded to the support surface 11 with an adhesive agent, for example.

The armature 20 works cooperatively with the field pole 10 to form a linear motor. The armature 20 is attached to a machine (not shown in the drawings) to be driven through a machine attachment surface 24a of the block 24 (described later).

As shown in FIG. 2, the armature 20 includes the core (integrated core) 21, a coil 22, a block attachment part 23, the block (component) 24, woven cloth 25 (protection sheet), and the resin layer 26. As described later, the block attachment part 23 is formed of two opposite block attachment grooves 212 (described later). FIG. 2 shows a position where the block attachment part 23 is to be formed.

FIG. 2 is an exploded (developed) perspective view of the armature 20. Thus, the resin layer 26 is omitted from FIG. 2. The resin layer 26 will be described later. A member such as a wire for supplying power to the coil 22 is omitted from FIG. 2.

The core 21 functions as a main body of the armature 20. As shown in FIG. 3B, the core 21 is formed of multiple split cores 211 coupled in the Y direction (FIGS. 2 and 3A show a state before the split cores 211 are coupled). The split core 211 is made from a magnetic material such as iron or silicon steel, for example.

As shown in FIG. 3A, the split core 211 has coupling surfaces 211a formed across the width direction (Y direction), and the block attachment groove (component attachment groove) 212 of a shape like a recess formed in an upper portion of each coupling surface 211a (Z1 side). The shape like a recess mentioned herein means a shape to form a half of the cross section of the block attachment part 23 (described later) in the Y-Z plane formed by making tight contact between the respective coupling surfaces 211a of adjacent block attachment grooves 212. As shown in FIG. 2, the block attachment groove 212 extends in the X (X1-X2) direction of the split core 211.

As shown in FIG. 3B, coupling the multiple split cores 211 makes tight contact between the respective coupling surfaces 211a of adjacent split cores 211. In this way, two opposite block attachment grooves 212 form the block attachment part 23.

As shown in FIG. 3A, in each of the split cores 211 arranged at opposite ends of the core 21, the block attachment groove 212 is provided at one of the coupling surfaces 211a across the width direction. In the split core 211 arranged at a position except the opposite ends of the core 21, the block attachment groove 212 is provided at each of the coupling surfaces 211a across the width direction.

As shown in FIG. 3A, the split core 211 is provided with a through hole 213. The through hole 213 is a hole for insertion of a rod 31 (described later) as a coupling member. As shown in FIG. 2, the through hole 213 is provided in an X-Z plane of the split core 211 and penetrates the split core 211 in the width direction (Y direction). (In FIG. 2, only the through hole 213 formed in the split core 211 on the front side is shown). As shown in FIG. 3A, the through hole 213 of this embodiment is provided between the block attachment groove 212 and the coil 22 in the thickness direction of the split core 211 (Z direction).

As described later, coupling the multiple split cores 211 while the block 24 and the woven cloth 25 are inserted together reduces the likelihood of distortion of the core 21 about the Y axis. Thus, one rod 31 is desirably attached as a coupling member to the core 21. However, to increase the rigidity of the integrated core 21, multiple rods 31 may be attached to the core 21.

The coil 22 is an armature winding to generate a magnetic field. Each coil 22 is housed in multiple slots (not shown in the drawings) formed inside the split core 211. In response to application of a single-phase alternating current or a three-phase alternating current to each coil 22, a shifting magnetic field is generated at the coil 22. Then, attractive force and repelling force act between the shifting magnetic field and a magnetic field at the field pole 10 and thrust is applied to the armature 20 by the components of these forces acting in the direction (Y direction) in which the armature 20 is driven. As shown in FIG. 1, in response to receipt of this thrust, the armature 20 moves linearly in the A (A1-A2) direction in which the permanent magnets 12 of the field pole 10 are arranged.

The block attachment part 23 is space recessed inwardly from a surface of the core 21 on a machine attachment side (Z1 side). As shown in FIG. 3B, the block attachment part 23 is formed between two opposite block attachment grooves 212 when the multiple split cores 211 are coupled to make tight contact between the respective coupling surfaces 211a of adjacent split cores 211. Like the block attachment groove 212, the block attachment part 23 formed by coupling the split cores 211 extends in the X (X1-X2) direction of the core 21.

As shown in FIG. 3B, the block attachment part 23 of this embodiment is space having a cross section of an inverted T-shape in the Y-Z plane. A portion of the block attachment part 23 corresponding to the vertical bar of "T" is opened toward the Z1 side. The block attachment part 23 is a part into which the block 24 (described later) is to be inserted at least partially.

The block attachment part 23 preferably has a groove shape of a dimension that achieves fixing force of such a degree that the block 24 is not pulled out easily in the depth direction of the core 21 (X direction) when the block 24 is inserted into the block attachment part 23 while the block attachment part 23 is covered with the woven cloth 25.

In the present embodiment, six split cores 211 are coupled to form five block attachment parts 23 in one core 21. However, the number of splits in the core 21, the number of the block attachment parts 23, etc. can be changed to conform to product specification, for example.

The block 24 is a metallic component to be attached to the block attachment part 23. As shown in FIG. 3C, the cross section of the block 24 in the Y-Z plane is formed into an inverted T shape similar (including a shape recognizable as being similar) to the shape of the groove of the block attachment part 23 shown in FIG. 3B. A portion of the block 24 corresponding to the vertical bar of "T" protrudes toward the Z1 side.

As shown in FIG. 3C, the block 24 includes the machine attachment surface 24a and the screw part 24b. The height dimension of the block 24 (in the Z direction) of this embodiment is set in such a manner that the machine attachment surface 24a protrudes from the resin layer 26 (described later) while the block 24 is inserted in the block attachment part 23.

The machine attachment surface 24a is a surface at the upper side (Z1 side) when the block 24 is inserted into the block attachment part 23. The machine attachment surface 24a is not always at the upper side. The machine (not shown in the drawings) to be driven by the linear motor 1 is attached to the machine attachment surface 24a. As explained later, after the block 24 is inserted into the block attachment part 23 and the resin layer 26 is formed, the machine attachment surface 24a is subject to planarization grinding.

The screw part 24b is a part into which a bolt (not shown in the drawings) belonging to the machine is to be inserted. As shown in FIG. 3C, the screw part 24b is provided with a female screw. The machine can be attached to the machine attachment surface 24a of the block 24 by inserting the bolt belonging to the machine into the screw part 24b and fastening the bolt and the screw part 24b together. As shown in FIG. 2, the screw parts 24b are provided at two positions along the longitudinal direction of the block 24 (X direction). Meanwhile, the screw part 24b may be provided at at least one position. The number of the screw parts 24b, the diameter of the screw hole of the screw part 24b, etc. can be changed to conform to product specification.

The woven cloth 25 is a sheet-like member covering a surface of the core 21 and that of the block attachment part 23. The woven cloth 25 is made from a material having ability to be impregnated with resin such as glass woven cloth or carbon fiber woven cloth, for example. As long as the woven cloth is made from a material having ability to be impregnated with resin, a material for the woven cloth may be a porous sheet-like material, for example, in addition to the exemplary materials described previously. The woven cloth 25 is placed over the surface of the split cores 211. The woven cloth 25 is also inserted into the inside of the block attachment part 212. Then, the folded woven cloth 25 is fixed at edges, tucked portions, etc., with adhesive tape or an adhesive agent, for example. By doing so, the surface of the split cores 211 can be entirely covered with the woven cloth 25.

The woven cloth 25 desirably has a size for covering the surface of the core 21 (coupled split cores 211) entirely. However, the woven cloth 25 is not always required to cover the entire surface of the core 21. The woven cloth 25 is expected to cover at least a part of the core 21 where thermal stress generated in the core 21 is likely to be transmitted to the resin layer 26 (described later) when the resin layer 26 is formed on the surface of the core 21, and to achieve a function for preventing liquid splashed onto the armature 20 from entering into the inside of the armature 20.

The resin layer 26 is a resin molding for covering the core 21 and the block attachment part 23 covered with the woven cloth 25. The resin layer 26 is formed by using epoxy resin, phenol resin, acrylic resin, or the like, for example. The resin layer 26 can be formed by being molded on the core 21 and the block attachment part 23 covered with the woven cloth 25, for example.

A procedure of manufacturing the armature 20 according to the first embodiment will be described next.

Figure 4A:
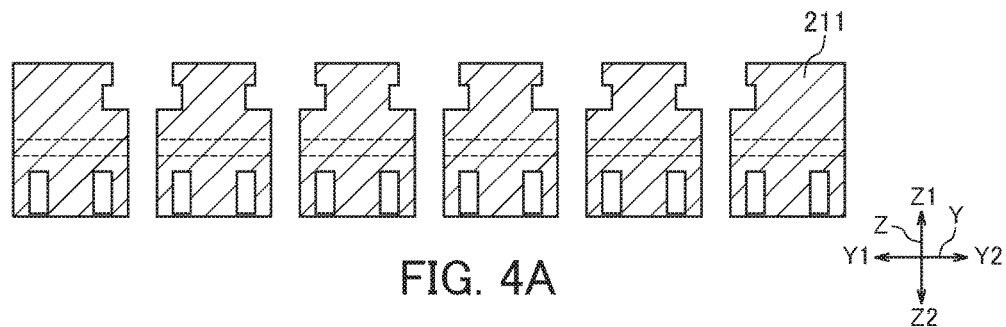
FIG. 4A explains a procedure of manufacturing the armature 20 of the first embodiment.
Figure 4B:
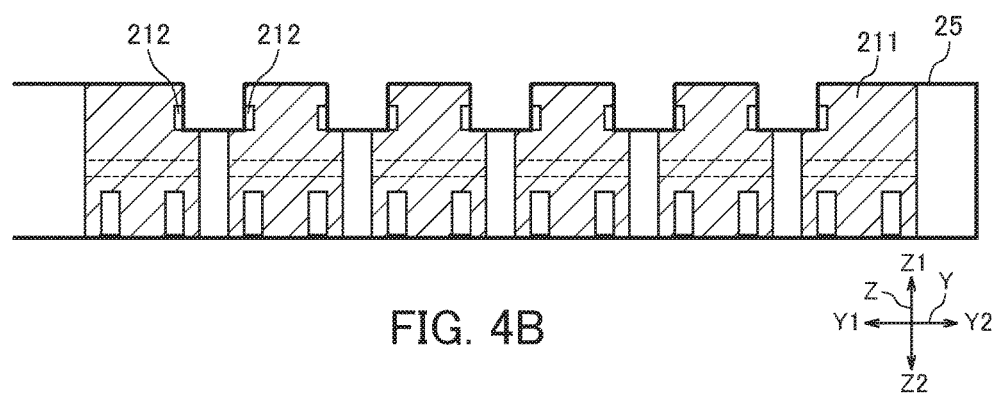
FIG. 4B explains the procedure of manufacturing the armature 20 of the first embodiment.
Figure 4C:
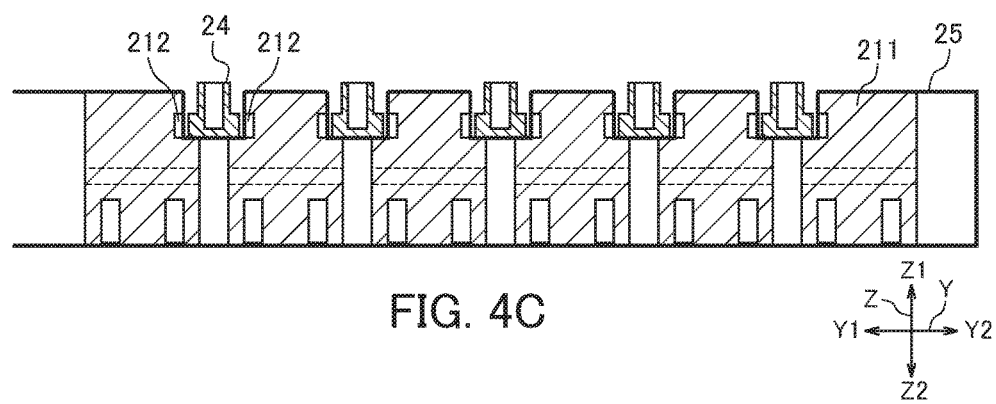
FIG. 4C explains the procedure of manufacturing the armature 20 of the first embodiment.

FIGS. 4A to 4C explain the procedure of manufacturing the armature 20 of the first embodiment. For example, like FIG. 3A, FIGS. 4A to 4C are sectional views of the core 21 in the Y-Z plane.

First, as shown in FIG. 4A, the multiple split cores 211 are arranged at intervals. The multiple split cores 211 are desirably arranged at intervals of degrees that allow the block 24 to be inserted from the thickness direction of the split cores 211 (Z direction).

Next, as shown in FIG. 4B, the surfaces of the multiple split cores 211 and those of the block attachment grooves 212 are covered with the woven cloth 25. The rod 31 (coupling member) is to be inserted into the split core 211 in a subsequent step. Thus, the woven cloth 25 is desirably placed in a state for not covering the split core 211 on one side of the woven cloth 25. The woven cloth 25 desirably covers the block attachment grooves 212 tightly. In this regard, by bending the woven cloth 25 slightly between adjacent block attachment grooves 212, the block attachment grooves 212 can be covered tightly with the woven cloth 25 when the multiple split cores 211 are coupled.

Next, as shown in FIG. 4C, the block 24 is inserted between the block attachment grooves 212 covered with the woven cloth 25 from the thickness direction of the split core 211 (Z direction).

Figure 4D:
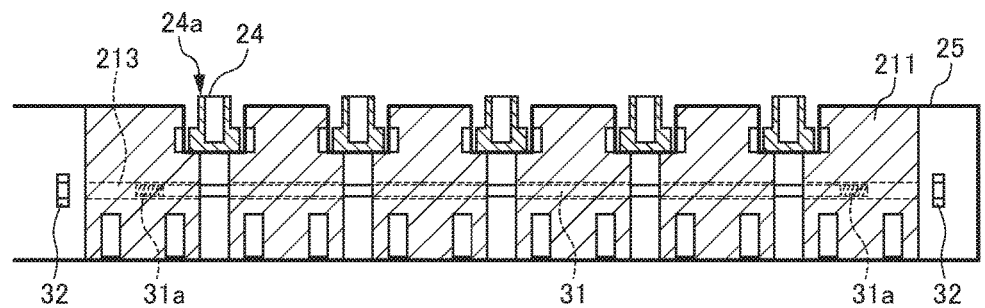
FIG. 4D explains the procedure of manufacturing the armature 20 of the first embodiment.

Next, as shown in FIG. 4D, the rod 31 is inserted into the through holes 213 in the multiple split cores 211 from a side not covered with the woven cloth 25 (Y1 side).

The rod 31 and a nut 32 (described later) are coupling members for coupling the multiple split cores 211. The rod 31 includes screw parts 31a at opposite ends of the rod 31. A male screw is formed at the screw part 31a.

As shown in FIG. 4A, the rod 31 may be inserted after the multiple split cores 211 are arranged at intervals and before covering with the woven cloth 25.

Reducing the intervals between the multiple split cores 211 with the rod 31 inserted in the through holes 213 of the multiple split cores 211 makes the screw parts 31a at the opposite ends of the rod 31 protrude from the coupling surfaces 211a belonging to corresponding ones of the split cores 211 arranged at the opposite ends in the Y direction. Then, the nuts 32 are fitted to the screw parts 31a at the protruding positions of the rod 31.

Figure 4E:
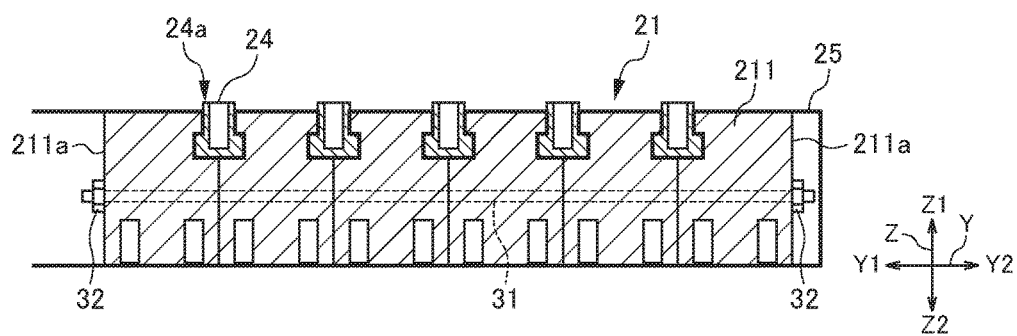
FIG. 4E explains the procedure of manufacturing the armature 20 of the first embodiment.

Next, as shown in FIG. 4E, the nuts 32 are fastened to couple the multiple split cores 211. In this way, the multiple split cores 211 become the integrated core 21. By coupling the multiple split cores 211, the woven cloth 25 covering the surface of the block attachment groove 212 is fixed while being caught between the block attachment part 23 of the split core 211 and the block 24. Further, coupling the multiple split cores 211 makes the woven cloth 25 extend along the shape of the groove. Thus, the inner surface of the block attachment part 23 (block attachment groove 212) is covered tightly with the woven cloth 25. Then, a side surface of the split core 211 through which the rod 31 has been inserted is covered with the woven cloth 25. As a result, the surface of the core 21 is covered entirely with the woven cloth 25.

Figure 4F:
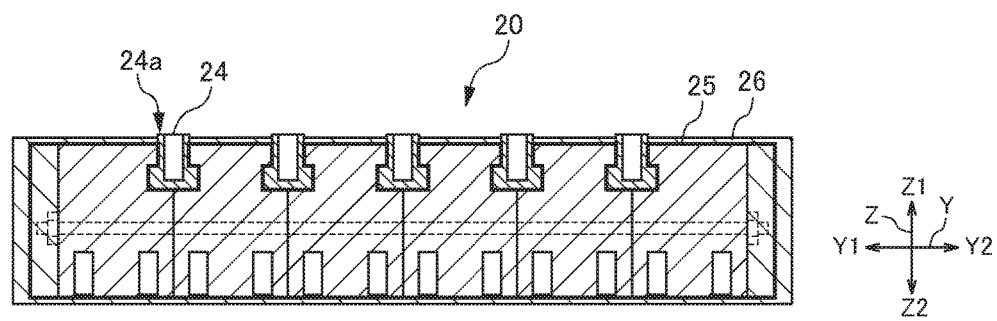
FIG. 4F explains the procedure of manufacturing the armature 20 of the first embodiment.

Next, as shown in FIG. 4F, the core 21 and the block attachment part 23 covered with the woven cloth 25 are molded with a resin material to form the resin layer 26. The resin layer 26 is formed only on a part covered with the woven cloth 25, so that the machine attachment surface 24a of the block 24 is exposed from the resin layer 26.

Next, the machine attachment surface 24a of the block 24 inserted in the armature 20 (block attachment part 23) is subject to planarization grinding, thereby completing formation of the armature 20 with the exposed machine attachment surface 24a planarized by grinding.

In the above-described armature 20 of the first embodiment, the machine attachment surface 24a is not covered with the woven cloth 25. Thus, the machine attachment surface 24a can be subject to planarization grinding. As a result, the armature 20 of the first embodiment can be attached precisely to the machine.

The height dimension of the block 24 (in the Z direction) of the first embodiment is set in such a manner that the machine attachment surface 24a protrudes from the resin layer 26 while the block 24 is inserted in the block attachment part 23. This eliminates the risk of grinding the resin layer 26 during planarization grinding on the machine attachment surface 24a. Thus, the likelihood of entry of a foreign material such as liquid can be reduced more effectively.

In the armature 20 according to the first embodiment, the resin layer 26 is formed so as to cover the core 21 and the block attachment part 23 covered with the woven cloth 25. In this way, the core 21 and the resin layer 26 are integrated with each other with the presence of the woven cloth 25 between the core 21 and the resin layer 26. This achieves a substantially uniform coefficient of linear expansion in the armature 20. Thus, the armature 20 according to the first embodiment is capable of reducing the likelihood of trouble in high-temperature or low-temperature environment such as warpage, undulation, breakage, or reduction in dimensional accuracy resulting from a difference in coefficient of linear expansion.

In the armature 20 according to the first embodiment, substantially entire surface of the core 21 and the block attachment part 23 are covered with the woven cloth 25. This makes it possible to reduce the likelihood of entry of liquid such as a cutting fluid (foreign material). As a result, the armature 20 according to the first embodiment achieves excellent precision in attachment to a machine and is capable of reducing the likelihood of trouble in the resin layer 26, entry of a foreign material, etc.

The block attachment part 123 according to the first embodiment is a groove having the cross section in the Y-Z plane formed into the inverted T shape. The cross section of the block 24 in the Y-Z plane is also formed into the inverted T shape similar to that of the groove of the block attachment part 123. In this configuration, coupling the multiple split cores 211 after arrangement of the block 24 makes a fit between the block 24 and the block attachment part 23. As a result, even if the block 24 is subject to stress acting in the Z1 direction, for example, the block 24 is not pulled out from the block attachment part 23. In this way, the armature 20 of the first embodiment can increase force of the block 24 for fixing the machine (not shown in the drawings) further when the armature 20 is attached to the machine.

The core 21 of the first embodiment with the multiple split cores 211 achieves the following effects.

If the core 21 is formed as a single member, for example, for attachment of the block 24 having an inverted T-shape in cross section to the core 21, the block 24 should be inserted from the depth direction of the core 21 (X direction). The surface of the block attachment part 23 is covered with the woven cloth 25 during this insertion. Hence, inserting the block 24 causes the risk of displacement or tear of the woven cloth 25. This gives rise to a need to correct the position of the woven cloth 25 covering the surface of the block attachment part 23 or exchange the woven cloth 25. Hence, inserting the block 24 into the core 21 is troublesome and time-consuming work.

In contrast, in the core 21 of the first embodiment, the block 24 can be inserted from the thickness direction of the split core 211 (Z direction) before the multiple split cores 211 are coupled. This can reduce the likelihood of trouble such as displacement or tear of the woven cloth 25 occurring during insertion of the block 24. In this way, there arises no need to correct the position of the woven cloth 25 covering the surface of the block attachment groove 212 or exchange the woven cloth 25, so that the block 24 can be inserted into the core 21 easily and reliably. As described above, the core 21 of the first embodiment increases assembling performance, contributing to increased productivity of the armature 20.

Second Embodiment

Figure 5:
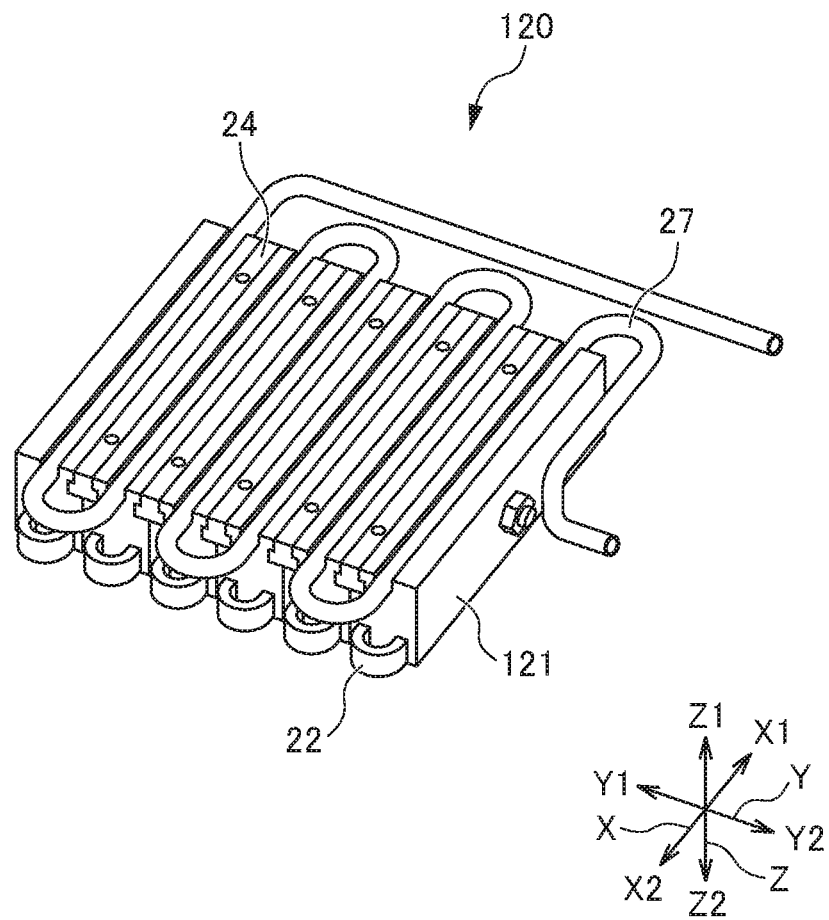
FIG. 5 is an exploded perspective view of an armature 120 of a second embodiment.

FIG. 5 is an exploded perspective view of an armature 120 of the second embodiment. Members such as the woven cloth 25 and the resin layer 26 are omitted from FIG. 5.

Figure 6A:
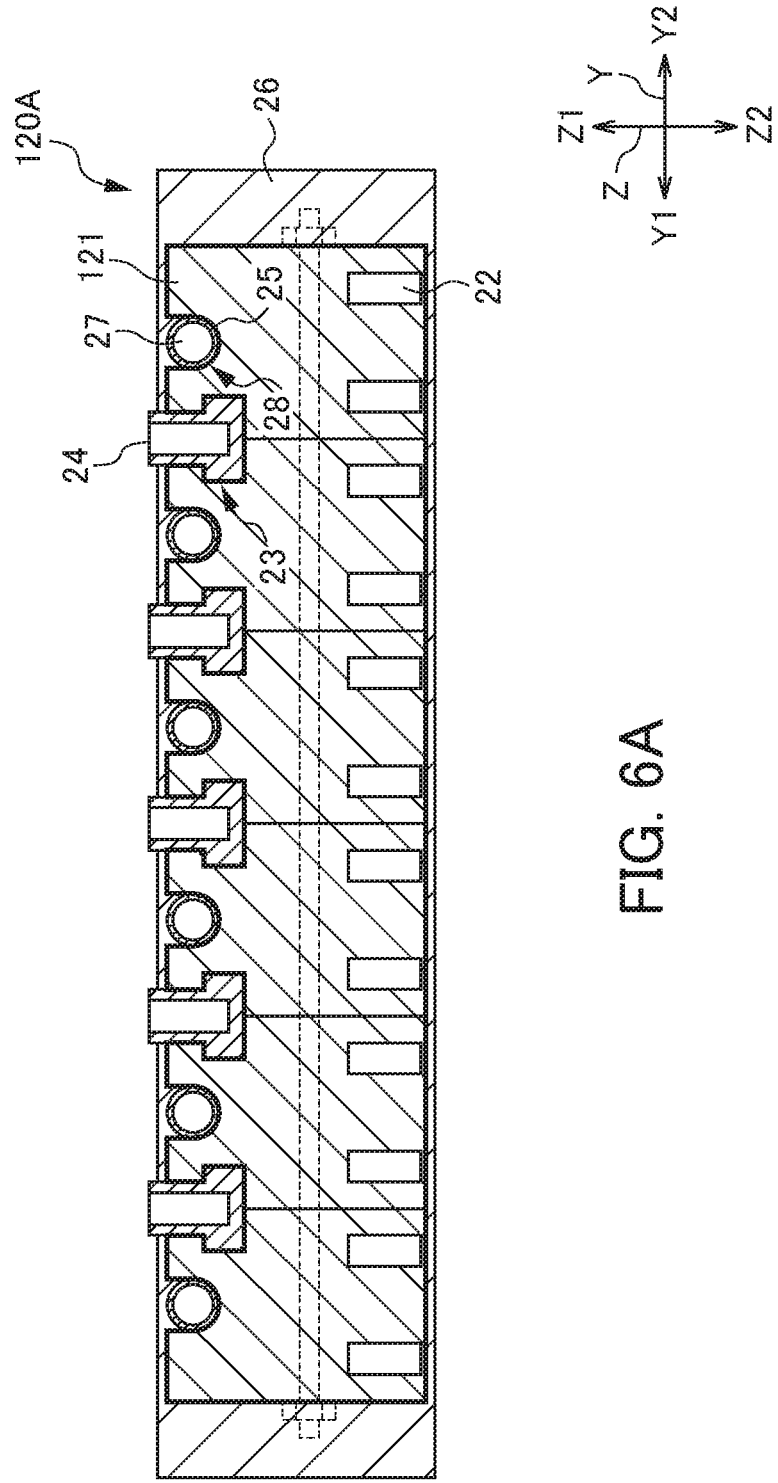
FIG. 6A is a sectional view showing a form of the armature 120 of the second embodiment.
Figure 6B:
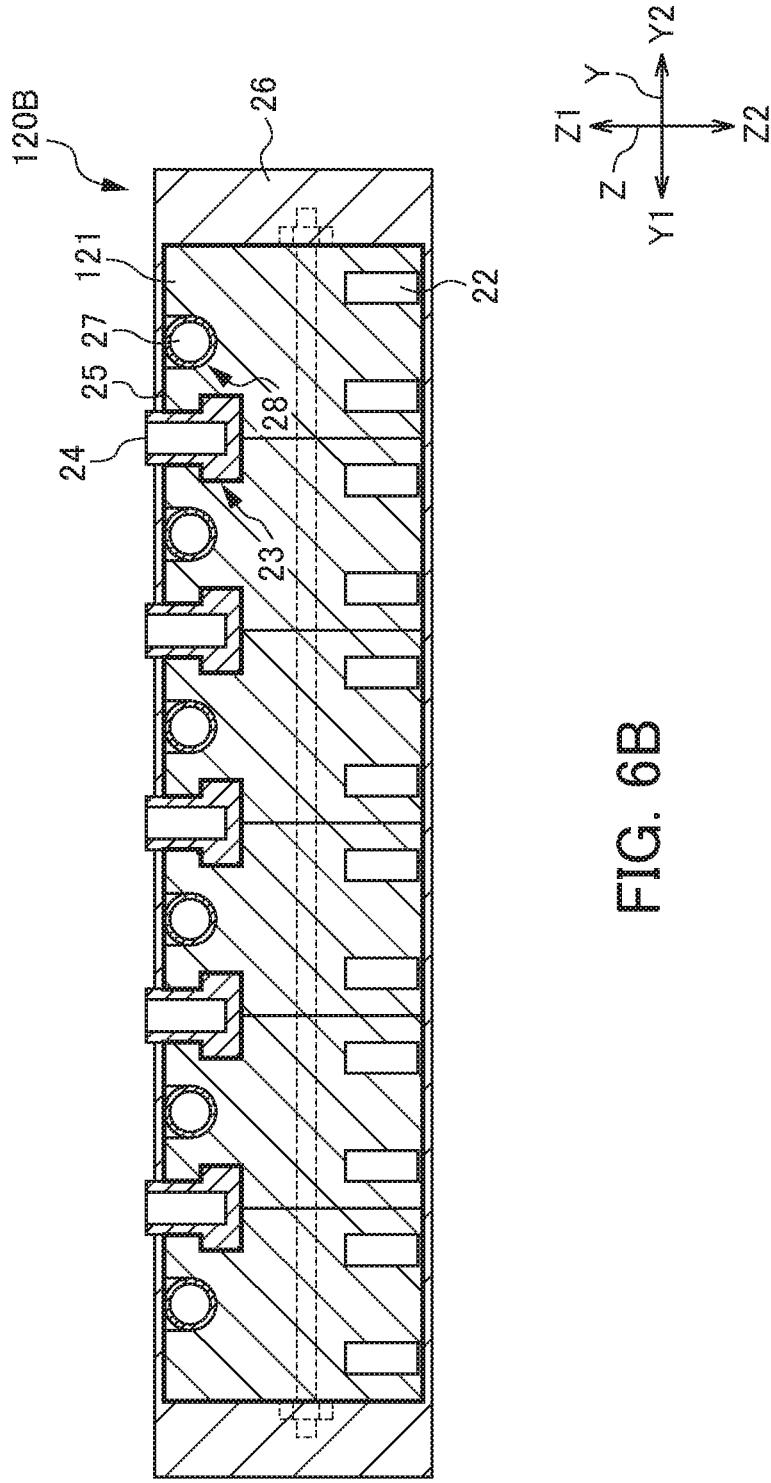
FIG. 6B is a sectional view showing a different form of the armature 120 of the second embodiment.

FIG. 6A is a sectional view showing a form of the armature 120 of the second embodiment. FIG. 6B is a sectional view showing a different form of the armature 120 of the second embodiment.

In the description of the second embodiment and drawings relating to the second embodiment, a structural element fulfilling the same function as that of the first embodiment is identified by the same sign or a sign with the same end (last two digits). Where appropriate, description overlapping between such elements will be omitted.

As shown in FIG. 5, the armature 120 of the second embodiment includes a cooling pipe 27 for cooling the coil 22. The cooling pipe 27 is placed in a siting groove 28 (described later) provided to a core 121. In the armature 120 of the second embodiment, the core 121 differs from the core 21 of the first embodiment in that the core 121 includes the siting groove 28 for the cooling pipe 27 in the other respects, the basic configuration of the core 121 of the second embodiment is the same as that of the core 21 of the first embodiment. Thus, members such as the block attachment part 23 and the block 24 will not be described.

In the present embodiment, the siting groove 28 is provided on a machine attachment surface side (Z1 side). Alternatively, the cooling pipe 27 may be provided inside of the core 121 partially or entirely, for example. In the present embodiment, the cooling pipe 27 and the block 124 are arranged alternately. Alternatively, the cooling pipe 27 may be arranged for every two blocks 124, for example. As described above, the shape, place of installation, etc. of the siting groove 28 are not limited to the examples shown in FIG. 5.

The following describes covering of the core 121 with the woven cloth 25 in the armature 120 including the cooling pipe 27. In an armature 120A shown in FIG. 6A, the woven cloth 25 is inserted into the inner side of the siting groove 28. The cooling pipe 27 is arranged in the siting groove 28 while the woven cloth 25 is placed between the cooling pipe 27 and the siting groove 28. By arranging the cooling pipe 27 in the siting groove 28, the inner surface of the groove of the siting groove 28 is covered more tightly with the woven cloth 25. In this form, the cooling pipe 27 arranged in the siting groove 28 is directly covered with the resin layer 26. In this form, the woven cloth 25 is caught between the cooling pipe 27 and the siting groove 28 (core 121). Thus, the woven cloth 25 is preferably made from a highly-flexible member having high heat conductivity. An example of such a member includes, but is not limited to, carbon fiber.

In an armature 120B shown in FIG. 6B, the cooling pipe 27 is arranged directly in the siting groove 28. The woven cloth 25 covers the cooling pipe 27 from above. In this form, the cooling pipe 27 arranged in the siting groove 28 is covered with the resin layer 26 while the woven cloth 25 is placed between the cooling pipe 27 and the resin layer 26.

In both the above-described forms shown in FIGS. 6A and 6B, when the core 121 and the block attachment part 123 are covered with the woven cloth 25, the siting groove 28 or a part corresponding to the siting groove 28 can be covered with the woven cloth 25 simultaneously.

The present invention is not limited to the above-described embodiments. Various modifications or changes such as modifications described later are applicable. These modifications or changes are also within the technical scope of the present invention. The effects described in these embodiments are merely a list of most preferred effects resulting from the present invention. Effects achieved by the present invention are not limited to those described in these embodiments. The above-described embodiments and the following modifications can be used in combination, where appropriate. However, such combinations will not be described in detail. The following description includes a structure common between the embodiments and such a structure will be given a name without a reference numeral.

(Modifications)

In the embodiments, the height dimension of the block (in the Z direction) is set in such a manner that the machine attachment surface protrudes from the resin layer while the block is inserted in the block attachment part. However, this is not the only setting. The height dimension of the block (in the Z direction) may be set in such a manner that the machine attachment surface is flush with the surface of the resin layer while the block is inserted in the block attachment part. Specifically, what is desired for the block is that the machine attachment surface be exposed from the resin layer while the block is inserted in the block attachment part.

In the embodiments, a female screw is formed at the screw part of the block, but the embodiments are not limited thereto. A male screw may be formed at the screw part, or a crooked hook is also applicable, for example. Specifically, the machine attachment surface may have any structure as long as it can engage with an attachment surface of a machine. In the case of a compact armature, for example, the screw part may be replaced by an adhesive agent or adhesive tape, for example, for fixing between the machine and the machine attachment surface. In this case, the screw part is not required, so that the machine attachment surface can be a flat surface.

In these embodiments, the block is inserted from the thickness direction of the split core (Z direction). However, this is not the only example. As shown in FIGS. 2, 3A, and 4C, while the multiple split cores are arranged at intervals, the block may be inserted from the depth direction of the split core (X direction). Even in this case, the likelihood of displacement or tear of the woven cloth can also be reduced during insertion of the block between the split cores. If the block has an inverted T-shape in cross section in the Y-Z plane while the block is to be inserted from the depth direction of the split core (X direction), the multiple split cores can be arranged at narrower intervals than in the embodiments. The protection sheet is not limited to the woven cloth described in the embodiments.

In the embodiments, the field pole (see FIG. 1) has a linear shape. However, the embodiments are not limited thereto.

The field pole may have an arc-like shape or a ring-like shape, for example. In the embodiments, the groove of the block attachment part has a rectangular shape or an inverted T-shape in cross section in the Y-Z plane. However, the embodiments are not limited thereto. The cross section of the block attachment part in the Y-Z plane may have a different shape. Further, the shape of the cross section of the block in the Y-Z plane is not required to be similar to the shape of the groove of the block attachment part.

For example, the cross section of the block attachment part may have a rectangular shape in the Y-Z plane, and that of the block may have a rectangular shape in the Y-Z plane similar to that of the block attachment part. Alternatively, the cross section of the block attachment part may have an L-shape in the Y-Z plane, and that of the block may have an L-shape in the Y-Z plane similar to that of the block attachment part. This modification realizes a configuration where the block attachment groove is provided at only one of the coupling surfaces of the split core. Still alternatively, the cross section of the block attachment part may have an inverted T-shape in the Y-Z plane, and that of the block may have an inverted T-shape (where a portion corresponding to the horizontal bar of "T" is short, for example) in the Y-Z plane not similar to that of the block attachment part.

The following configuration is applicable to the embodiments: one of the coupling surfaces of the split core 211 across the width direction (Y direction) has a recess, and the other of the coupling surfaces has a protrusion. In this configuration, connecting the multiple split cores 211 makes a fit between the recess of a split core 211 and the protrusion of an adjacent split core 211. This can reduce the likelihood of displacement in the thickness direction (Z direction) occurring when the multiple split cores 211 are coupled. Applying this configuration to a compact armature makes it possible to omit the rod 31 and the nut 32 as coupling members.

In these embodiments, the rod and the nut are used as coupling members for coupling the multiple split cores. However, this is not the only example. For example, the coupling member may be an elongated knock pin (taper pin) to be fixed by being press-fitted into the through holes in the multiple split cores. In the case of a compact armature, the multiple split cores may be coupled with an adhesive agent.

EXPLANATION OF REFERENCE NUMERALS

1: Linear motor, 10: Field pole, 20, 120: Armature, 21, 121: Core, 22: Coil, 23: Block attachment part, 24: Block, 24a: Machine attachment surface, 25: Woven cloth, 26: Resin layer, 31: Rod, 32: Nut, 211: Split core, 212: Block attachment groove

What is claimed is:

1. An armature for linear motor working cooperatively with a field pole to form a linear motor, the field pole including magnets of different poles arranged alternately in a driving direction, the armature comprising:
    an integrated core with multiple split cores coupled to each other;
    a coupling member for coupling the multiple split cores;
    a coil attached to the integrated core;
    a block attachment part provided at a machine attachment side of the integrated core on a machine attachment side;
    a protection sheet having ability to be impregnated with resin and covering a surface of the integrated core and a surface of the block attachment part;
    a block attached to the block attachment part and having a machine attachment surface arranged at the block attachment side of the integrated core; and
    a resin layer covering the protection sheet covering the integrated core, wherein
    the machine attachment surface of the block is exposed from the resin layer.

2. The armature for linear motor according to claim 1, wherein the split cores include respective block attachment grooves formed at coupling surfaces of the split cores, and
    while the multiple split cores are coupled with the coupling member, opposite ones of the block attachment grooves in a pair form the block attachment part.

3. The armature for linear motor according to claim 1, wherein the machine attachment surface of the block protrudes from a surface of the resin layer.

4. A linear motor comprising: a field pole including magnets of different poles arranged alternately in a driving direction; and
    the armature for linear motor according to claim 1.

5. A method of manufacturing an armature for linear motor working cooperatively with a field pole to form a linear motor, the field pole including magnets of different poles arranged alternately in a driving direction, the method comprising:
    a step of arranging multiple split cores including respective component attachment grooves at an interval that allows insertion of an attachment target component;
    a step of covering respective surfaces of the split cores and respective surfaces of the component attachment grooves with a protection sheet;
    a step of inserting the component between the component attachment grooves of adjacent ones of the split cores;
    a step of fixing the protection sheet between the component attachment grooves of adjacent ones of the split cores and the component by coupling the multiple split cores with a coupling member and making tight contact between the adjacent ones of the split cores; and
    a step of forming a resin layer on the respective surfaces of the split cores covered with the protection sheet.

* * * * *